United States Patent [19]

Carlson et al.

[11] Patent Number: 4,621,782

[45] Date of Patent: Nov. 11, 1986

[54] ARRANGEMENT FOR MOUNTING APPARATUS

[75] Inventors: Richard L. Carlson, Plano; William J. Proetta, Elburn, both of Ill.

[73] Assignee: AT&T Bell Laboratories, Murray Hill, N.J.

[21] Appl. No.: 634,601

[22] Filed: Jul. 26, 1984

[51] Int. Cl.⁴ ............................................. F16M 11/12
[52] U.S. Cl. .................................... 248/183; 248/349
[58] Field of Search ............. 248/346, 349, 178, 179, 248/181, 183, 663, 665, 664, 371

[56] References Cited

U.S. PATENT DOCUMENTS

| | | | |
|---|---|---|---|
| 2,922,609 | 1/1960 | Collier | 248/179 |
| 3,103,356 | 4/1958 | Heines et al. | 272/52 |
| 4,068,961 | 1/1978 | Ebner et al. | 248/181 X |
| 4,304,385 | 12/1981 | Farouche et al. | 248/410 |
| 4,349,173 | 9/1982 | Volka | 248/346 |
| 4,365,779 | 12/1982 | Bates et al. | 248/179 X |
| 4,368,867 | 1/1983 | Pendleton et al. | 248/346 |
| 4,372,515 | 2/1983 | Noonan | 248/178 |
| 4,395,010 | 7/1983 | Helgeland et al. | 248/371 |
| 4,410,159 | 10/1983 | McVicker et al. | 248/349 |
| 4,415,136 | 11/1983 | Knoll | 248/181 |
| 4,483,503 | 11/1984 | Gahan | 248/349 |
| 4,533,105 | 8/1985 | Cornwell et al. | 248/183 X |
| 4,542,872 | 9/1985 | Marino et al. | 248/349 X |
| 4,549,710 | 10/1985 | Prince et al. | 248/183 |
| 4,564,166 | 1/1986 | Craft et al. | 248/183 X |
| 4,570,892 | 2/1986 | Czech et al. | 248/183 X |

FOREIGN PATENT DOCUMENTS 2507282 12/1982 France ................... 248/183

Primary Examiner—J. Franklin Foss
Assistant Examiner—David M. Purol
Attorney, Agent, or Firm—Werner Ulrich; Peter Visserman

[57] ABSTRACT

Apparatus for mounting a movable superstructure on a fixed base is disclosed. The superstructure, a video display unit, is attached to a cylindrical segment journal which rests on a matching cylindrical segment socket. The journal rotates within the socket as the video display unit is tilted back and forth. Two helical springs are each attached to the superstructure and the base in such a way as to counteract gravitational forces and to tend to restore the superstructure to a neutral tilt angle when it is moved therefrom. The surfaces of the journal and socket have enough friction to exceed the relatively small differences between the gravitational forces tending to move the superstructure further from the neutral tilt angle and the spring forces tending to restore the superstructure thereto. As a result, the superstructure will maintain any position but can be moved (tilted) by overcoming only the relatively small frictional force. In one constructed model, a video display unit superstructure weighing 27.2 pounds (12.3 kilograms) was provided with a maximum backward tilt of 30 degrees and could be tilted to any position upon the application of a force of only three pounds (1.4 kilograms).

21 Claims, 6 Drawing Figures

ARRANGEMENT FOR MOUNTING APPARATUS

TECHNICAL FIELD

This invention relates to arrangements for mounting apparatus, and, more specifically, for the adjustable mounting of a superstructure on a fixed base.

BACKGROUND OF THE INVENTION

Many types of equipment gain added versatility from a flexible mounting arrangement. The most common example is a lamp which can be arranged to shine on an appropriate surface as needed. However, the kinds of arrangements used for lamps, which have a relatively heavy base and a relatively light superstructure are of limited utility for controlling the positioning of a relatively heavy superstructure on a relatively light base. Such an arrangement is needed, for example, for adjustable orientation video display terminals used in computer and communications systems.

Many arrangements have been used to allow video display terminals to be mounted so that the superstructure containing a cathode ray tube (CRT) can be tilted back and forth to minimize glare. When a superstructure is tilted so that its center of gravity is no longer directly above or below its support axis, gravity exerts a torque on the superstructure tending to change the tilt angle. A number of different arrangements are available to adjust and maintain a given tilt angle in a display terminal. For example, a display terminal sold by the Data General Corporation includes a costly high strength encompassing arm structure and a costly high strength housing to support the heavy CRT assembly from the sides. Here, the center of gravity is close to the support axis so that the forces tending to move the superstructure away from a given tilt angle are weak, and a relatively simple friction bolt will maintain a given tilt angle.

In another prior art display terminal sold by Teletype Corporation, a superstructure which is supported at the base has a tilt angle that is adjustable in steps over a relatively small range, up to 15 degrees from vertical. Here, the center of gravity of the superstructure is much higher than the support axis at the base, so that a large torque tends to move the superstructure away from a given tilt angle when the superstructure is in an extreme tilt position, because the center of gravity is then substantially displaced from a position above the support axis. The support includes a costly high strength toothed arrangement for locking the superstructure into one of seven positions.

Another base supported arrangement manufactured by Wyse Technology, San Jose, Calif., uses only friction to maintain a given tilt and also avoids the structural expense of the high strength support arms and the high strength superstructure housing. Here, the center of gravity is also much higher than the center of rotation of the superstructure, so that substantial forces tend to move the superstructure further from a neutral position when it is displaced substantially therefrom. However, the tilt is limited to 20 degrees from vertical, insufficient for support applications in which an operator sometimes works from a standing position. In this type of arrangement, if the friction is too great, the unit does not tilt readily; however, the friction must be great enough to maintain a superstructure position near the extreme levels of tilt adjustment.

Accordingly, there is no satisfactory mounting arrangement in the prior art for conveniently adjusting a heavy superstructure, such as the CRT assembly of a video display terminal, over a large continuously adjustable tilt angle. This large angle is needed, for example, if the operator using the terminal may be standing or sitting.

SUMMARY OF THE INVENTION

In accordance with the present invention, apparatus for movably mounting a superstructure on a base has two matching, slidingly engaged, curved surfaces, attached to the superstructure and the base, and a spring arrangement tending to counteract gravitational forces. When the superstructure is tilted from a neutral tilt angle and the center of gravity is no longer directly above or below the tilt axis, gravity exerts a force tending to move the superstructure; the spring arrangement exerts a force tending to counterbalance this gravitational force. Friction between the two surfaces compensates for any difference between the gravitational force and the counterbalancing spring force. Advantageously, such a mounting arrangement allows a superstructure to be moved easily and to be maintained in any position within wide limits of tilt angle. Further, because the superstructure is supported from below, no arm supports are required and the side walls are not required to provide structural support.

In one embodiment of the invention, the two surfaces are portions of a cylindrical surface. The spring arrangement includes two opposing helical extension springs, each attached to the base and the superstructure. One of the two slidingly engaged surfaces is composed of thermosetting plastic material; the other surface includes adhering bearing strips with a relatively smooth surface made of ultrahigh molecular weight polyethylene material. Advantageously, this provides a bearing surface arrangement having a smooth sliding action with only moderate sliding friction, giving the person adjusting the superstructure "finger tip control" over a large tilt angle range, and a good "feel" of a continuous, low resisting force as the tilt angle is adjusted. Advantageously, such an arrangement permits a large angle of tilt for a heavy superstructure, such as a video display terminal, whose center of gravity is much higher than the support axis. The large angle of backward tilt is particularly advantageous since it allows an operator to use the terminal in a standing position as well as in the customary sitting position. Advantageously, if tilt in only one direction from the neutral position is required, only one spring is needed.

In an alternative embodiment of the invention, the two surfaces are portions of a spherical surface. Advantageously, such an arrangement can be used to rotationally adjust the superstructure about a vertical as well as a horizontal axis, while maintaining the advantages of easy, smooth adjustment.

BRIEF DESCRIPTION OF THE DRAWING

The organization and operation of the mounting apparatus designed according to this invention will be better understood from a consideration of the detailed description in conjunction with the accompanying drawing in which.

DETAILED DESCRIPTION

Figure 1:
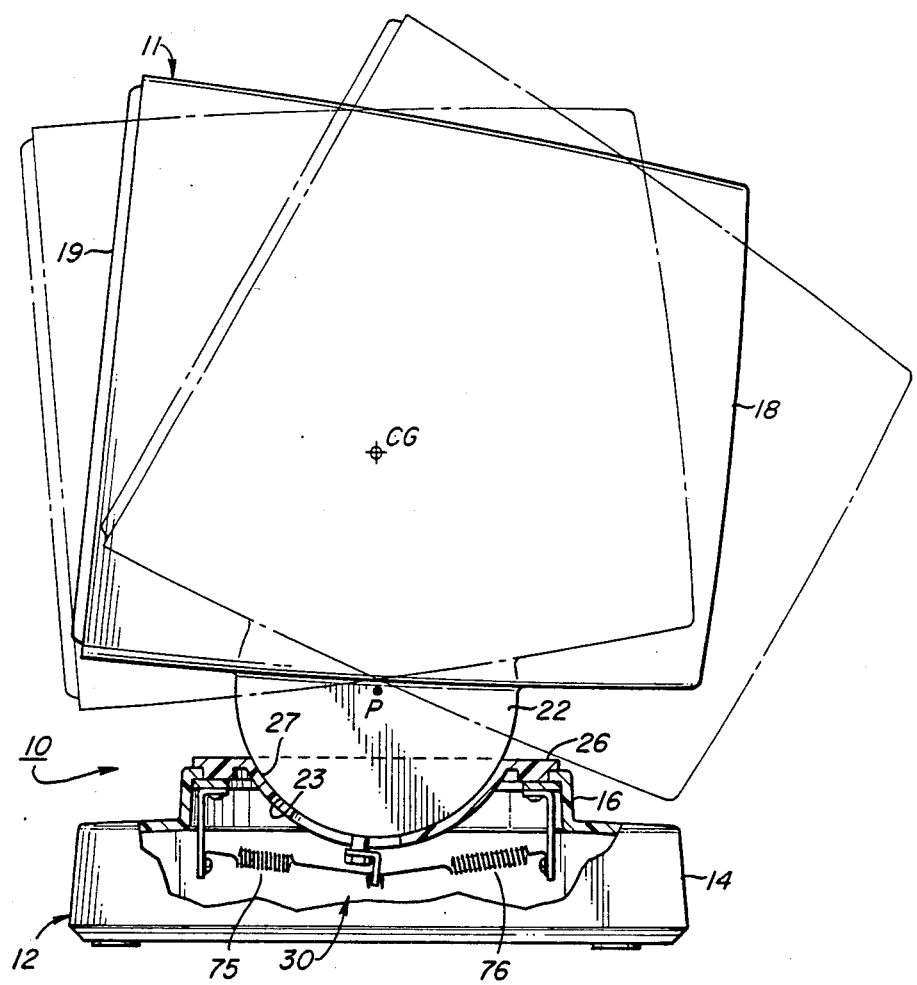
FIG. 1 is a side view of a video display terminal utilizing one exemplary embodiment of the mounting apparatus of this invention.
Figure 2:
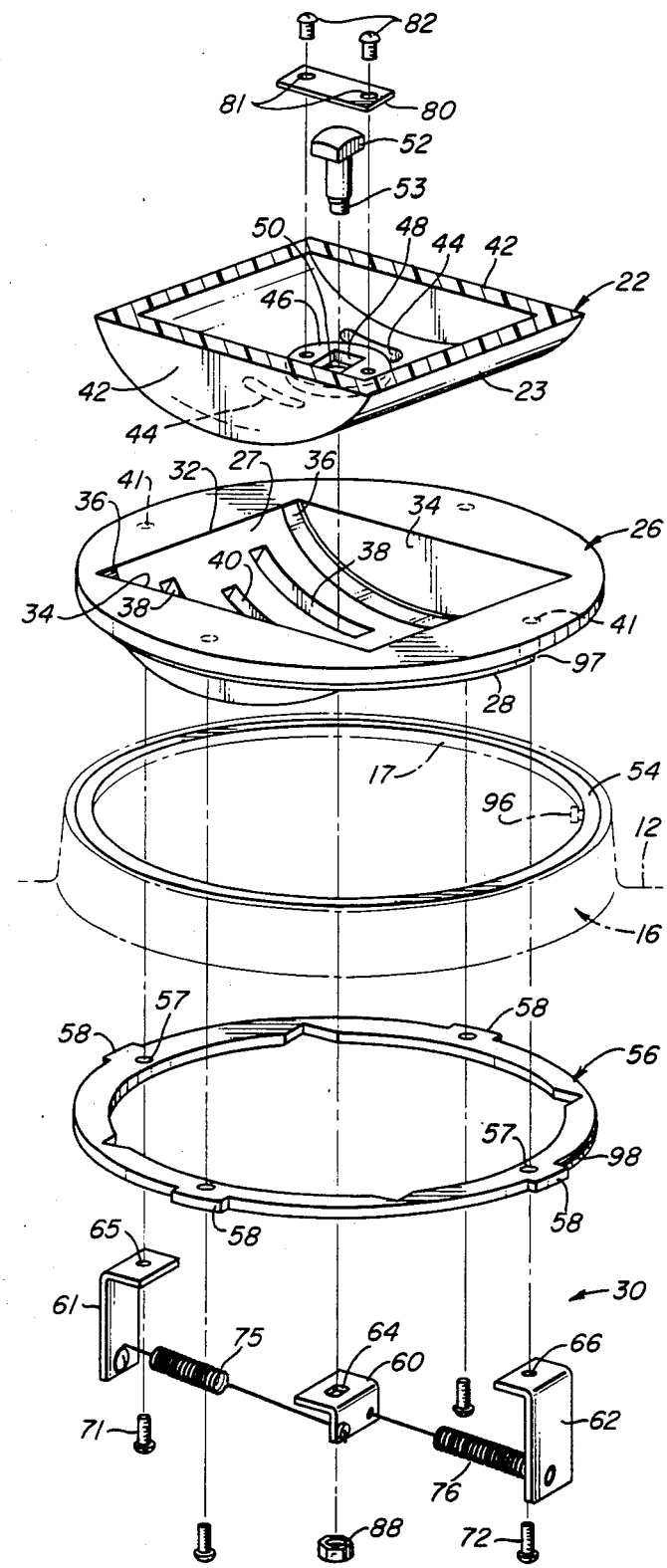
FIG. 2 is an exploded view of the mounting apparatus depicted in FIG. 1 showing the elements thereof.

FIG. 1 illustrates an arrangement of the adjustable mounting apparatus 10 of this invention, the details of which are shown in FIG. 2, being used to support the superstructure 11 of a video display terminal atop a base assembly 12. The base assembly 12 provides a housing 14 for electronic components and an annular support 16 upon which the adjustable mounting apparatus 10 is able to rotate about a vertical axis. The superstructure 11 has a housing 18, for a CRT or video display unit 19 and associated electronic components, which is attached to a journal 22 of the adjustable mounting apparatus 10. The journal 22 has the shape of a segment of a cylinder, in this embodiment, nearly a semicylinder, whose axis of rotation is a horizontal axis P (the end point of which is designated P in the drawing). The convex surface 23 of the journal 22 bears on a matching concave surface 27 within a socket bearing 26 enabling superstructure 11 to be tilted forward or backward about the horizontal axis of journal 22. The limits of forward and backward tilt of this exemplary embodiment of the invention, 5 degrees forward and 30 degrees backward, are shown by the phantom lines in FIG. 1.

The center of gravity of this superstructure, marked CG, is much higher than horizontal axis P. The wide range of tilt, especially backward, causes a movement of the center of gravity CG far beyond the horizontal axis P of the adjustable mounting apparatus 10. Normally a substantial shift in the center of gravity CG would overcome the relatively small frictional forces between the journal 22 and socket bearing 26 causing the superstructure 11 to tilt unobstructed to one of its extreme limits. However, a spring mechanism 30 attached between the socket bearing 26 and journal 22 approximately compensates for the gravitational force tending to pull the superstructure to one of its limits, and permits a relatively small frictional force to retain the superstructure 11 in the position where it is set by an operator. Additionally the relatively small frictional force between the journal 22 and socket bearing 26 gives the operator one-handed, finger tip control with smooth operation over the entire tilting range of the adjustable mounting apparatus 10.

In one constructed model, a helical extension spring 75 having a spring constant of 5.0 lb/in (0.89 kg/cm) approximately compensates for the gravitational force tending to pull a 27.2 pound (12.3 kilogram) superstructure 11 to its forward limit and a helical extension spring 76 having a spring constant of 5.0 lb/in (0.89 kg/cm) approximately compensates for the gravitational force tending to pull the superstructure 11 to its backward limit. At the extreme backward position, the center of gravity CG of the superstructure 11 exerts a clockwise torque of 49.2 in-lb (56.7 cm-kg) about the horizontal axis P and the expanded spring 76 exerts a counter-clockwise or compensating torque of 37.2 in-lb (42.9 cm-kg). When changing the tilt angle, the operator applies only a relatively small force of 3 pounds (1.4 kilograms) to overcome the frictional force between the convex surface 23 and concave surface 27. This frictional force advantageously improves the "feel" of movement of the adjustable mounting apparatus 10.

FIG. 2 is an exploded view of the adjustable mounting apparatus 10, which includes the journal 22 with its convex surface 23 that conforms to the matching concave surface 27 of the socket bearing 26. As previously mentioned, socket bearing 26 is mounted in an annular support 16 to permit the superstructure 11 to be rotated about its vertical axis. A washer 54 placed atop a flange 17 of the annular support 16 provides a low friction surface between the superstructure 11 and base assembly 12 when superstructure 11 is rotated to the left or right. In the constructed model of the invention the operator has to apply a force of only 1.25 lb (0.57 kg) on the right or left side of the housing 18 in order to rotate the superstructure 11 to a desirable position. A retaining ring 56 holds the mounting apparatus 10 to the annular support 16 and has four tabs 58 equally spaced apart which maintain the axial alignment of the mounting apparatus 10 within the annular support 16.

The spring mechanism 30 is attached to the journal 22 by a center bracket 60 and to the socket bearing 26 by a front bracket 61 and a rear bracket 62. A square head shoulder screw 52 is held in a boss 46 of the journal 22, passes through a screw access slot 40 of the socket bearing 26 and through a hole 64 of the center bracket 60, securing the bracket 60 between a shoulder 53 of the shoulder screw 52 and a locknut 88. A screw 71 passes through a hole 65 of the front bracket 61, a hole 57 of the retaining ring 56 and is secured in one of the threaded mounting holes 41 of the socket bearing 26. The extension spring 75 links the front bracket 61 to the center bracket 60 and extension spring 76 links the rear bracket 62 to the center bracket 60. As the superstructure 11 is pushed backward, the center bracket 60 moves forward and extends spring 76 which exerts an opposite force tending to restore the superstructure 11 to its neutral position. The neutral position is that position in which the center of gravity of the superstructure is directly above the axis of rotation; in this position, the superstructure tends to move neither forward nor backward. Only spring 76 is active when the superstructure 11 is pushed substantially backward from the neutral position and likewise only spring 75 is active when superstructure 11 is pulled substantially forward from the neutral position. In FIG. 1, the superstructure 11 is shown tilted backward 6 degrees which is the neutral position of one constructed model.

FIG. 2 also illustrates the construction of each of the coactive elements, socket bearing 26 and journal 22, of the adjustable mounting apparatus 10. The bearing socket 26 has molded into its circular shape a socket 32 defined by the concave surface 27 and end walls 34. The concave surface 27 has bonded near each end thereto, thin bearing strips 36 for frictionally supporting journal 22. The concave surface 27 also has formed therein cable access slots 38 which are equally spaced apart from a centrally located screw access slot 40. Four threaded mounting holes 41 are provided in the bottom surface at the periphery of the socket bearing 26.

The journal 22, shown broken away from its parent housing 18, consists of side walls 42 and the convex surface 23 which conforms to the circumferential dimension presented by the bearing surface of strips 36 within the socket 32. The convex surface 23 also has formed therein cable access slots 44 whose locations conform to the cable slots 38 of the socket bearing 26. A centrally located boss 46 provides a square recess 48 and bolt access hole 50 which is used to capture the square head shoulder screw 52.

Figure 3:
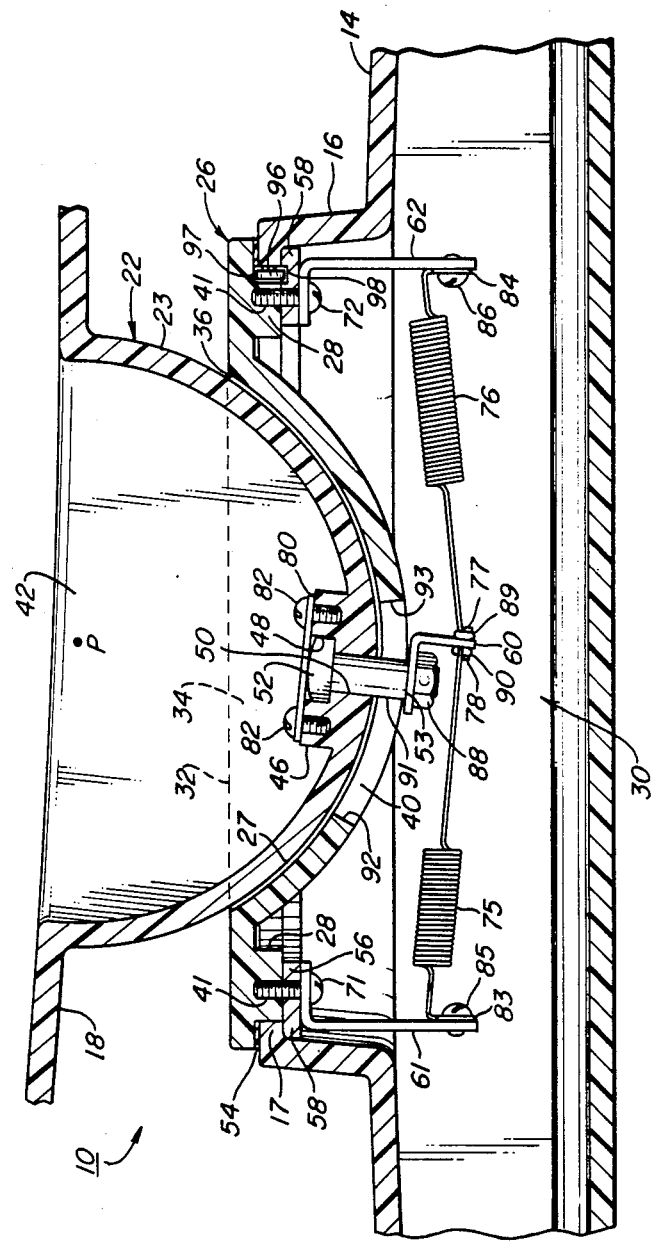
FIG. 3 is a vertical sectional view through the mounting apparatus depicted in FIG. 1 showing the assembly of the elements.

FIG. 3 illustrates the assembly of the adjustable mounting apparatus 10 atop the annular support 16 of base assembly 12. The socket bearing 26 rotates upon flange 17 of the annular support 16 with washer 54 inserted therebetween. The socket bearing 26 is secured to the annular support 16 by screws 71 and 72 which are inserted from underneath the base assembly 12 and which fasten front bracket 61 and rear bracket 62 to retaining ring 56 and to an annular flange 28 on the underside of the socket bearing 26.

The journal 22 rests within the socket 32 of the socket bearing 26 and atop bearing strips 36. The journal 22 is prevented from being lifted out of socket 32 by shoulder screw 52, center bracket 60, and locknut 88. The square head shoulder screw 52 is secured within the square cavity 48 of boss 46 by a plate 80 and screws 82 and protrudes through hole 50 and access slot 40 of the socket bearing 26. The shoulder 53 of shoulder screw 52 extends slightly beyond the underside of socket 32; thus when the center bracket 60 is fastened between the shoulder 53 and locknut 88 it does not come in contact with the underside of the socket 32, but does prevent the removal of the superstructure 11 from the base assembly 12.

Figure 5:
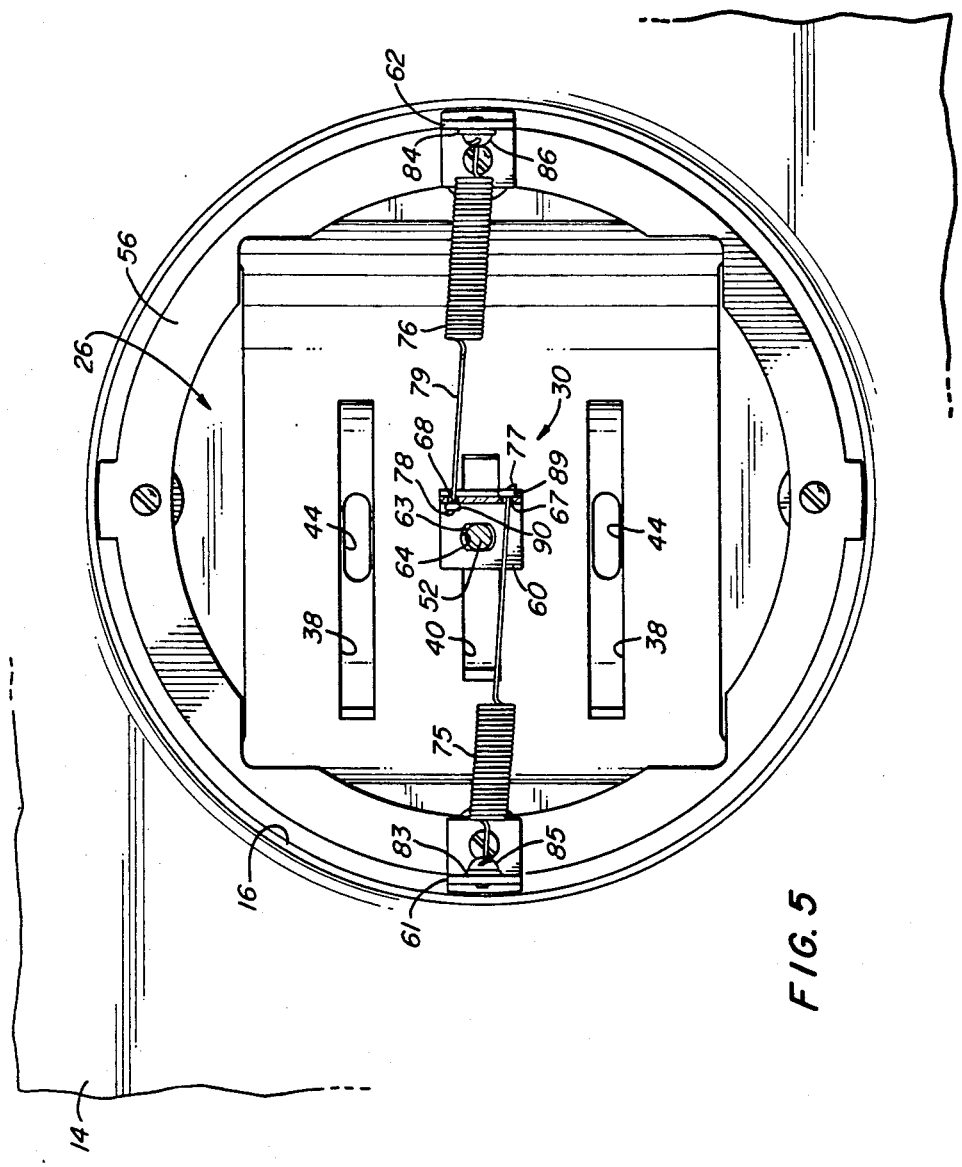
FIG. 5 is a view of the bottom of the mounting apparatus depicted in FIG. 1 showing the elements of the spring mechanism.

In addition, the shoulder screw 52 provides a means of fastening journal 22 to spring mechanism 30, as further illustrated in FIG. 5. A semicircular hole 64 in the center bracket 60 prevents center bracket 60 from rotating when spring 75 or 76 is extended. Two through-holes 67 and 68 are provided in the center bracket 60 to catch inner-formed spring ends or tines 77 and 78 of extension springs 75 and 76 respectively. Two "O" rings 89 and 90 cushion tines 77 and 78 against center bracket 60 to help provide smooth and quiet operation of spring mechanism 30. The outer-formed end or loop 83 of extension spring 75 is attached to front bracket 61 by screw 85. The loop 84 of extension spring 76 is similarly attached to rear bracket 62 by screw 86. The extension springs 75 and 76 are both slightly extended (not readily apparent in the drawing) when the superstructure 11 is in the neutral position to help provide smooth operation of the spring mechanism 30 as the superstructure is tilted through the neutral position.

Figure 4:
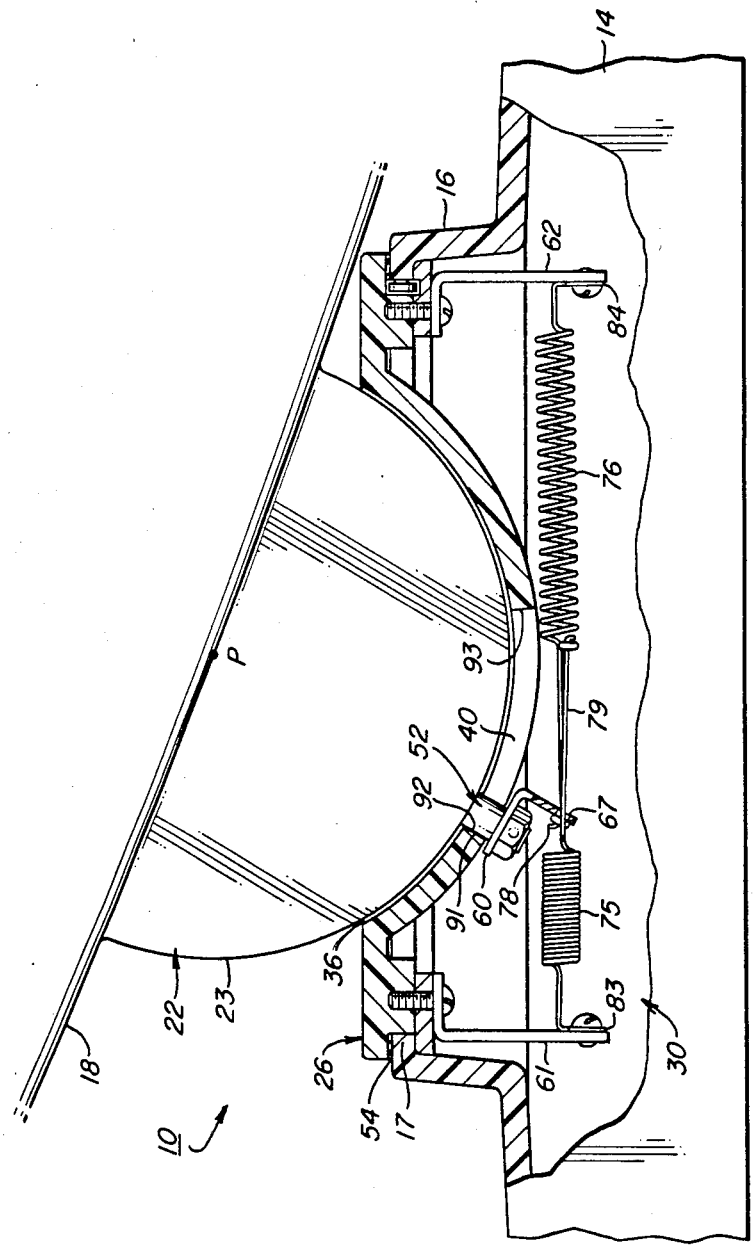
FIG. 4 is an enlarged view of the mounting apparatus depicted in FIG. 1 showing the operating relationship of the elements.

The operation of the adjustable mounting apparatus 10 is illustrated in FIG. 4. In a case where an operator may be using the video display terminal on a desktop but is working in a standing position, the operator can adjust superstructure 11 sharply backward. As the operator pushes the top of the housing 18 backward, the journal 22 rotates about its axis of rotation, horizontal axis P. The convex surface 23 of journal 22 moves over the surface of the bearing strips 36, and the center bracket 60 pulls on tine 78, expanding spring 76. As the weight of the superstructure 11 exerts a torque in the the clockwise direction, an opposite torque is exerted by the extended spring 76 about the axis of rotation, horizontal axis P. The operator can stop the video display terminal superstructure 11 at any point within its range of movement and the position of the superstructure 11 remains stable because the extended spring 76 exerts a torque that approximately compensates for the torque caused by the weight of the superstructure; the relatively small frictional force between convex surface 23 and bearing strips 36 is enough to make up the difference between the two torques.

It should be noted here that as spring 76 is extended, spring 75 remains unextended because center bracket 60 moves toward extension spring 75 allowing a straight portion 79 of extension spring 75 to pass freely within through-hole 67. In a similar manner, as the superstructure 11 is tilted forward, spring 75 becomes extended and spring 76 remains unextended. However, because springs 75 and 76 are slightly expanded in the neutral position, there is a small distance in the center range of movement where one spring begins expanding while the other spring is still restoring. Thus, a feeling of spasmodic motion is eliminated that would otherwise be felt if one spring was completely restored before the other began expanding.

When the superstructure 11 is moved by the operator to the extreme backward position, the shank 91 of shoulder screw 52 is butted against the front end 92 of slot 40. The extreme forward position is defined by the point where the shank 91 of shoulder screw 52 is butted against the back end 93 of slot 40. While one exemplary embodiment of this invention utilizes a 5-degree range of forward tilt, a video display terminal for use on a high shelf could have a much larger forward range of tilt by extending slot 40 backward. If no forward tilt from the neutral position is required, then the back end 93 of slot 40 can be brought further forward and spring 75 can be eliminated.

Cabling between electronic components or connectors in the base assembly 12 and superstructure 11 is hidden by providing cabling access through the adjustable mounting apparatus 10. FIG. 5 shows cable access slots 44 of the journal 22 in alignment with cable access slots 38 of the socket bearing 26. As the superstructure 11 is tilted, the access slots 44 move within the range defined by the access slots 38 but never beyond the point where the cables can be pinched or deformed. The relatively narrow dimensions of the access slots 38 and 44 and their location do not harm the structural integrity of the coactive journal 22 and socket bearing 26.

As previously mentioned, the adjustable mounting apparatus 10 also rotates atop annular support 16 and washer 54. In order to further protect cabling between the base assembly 12 and housing 18, the degree of rotation is limited by a stop 96 on flange 17 of annular support 16. A groove 97 in flange 28 of the socket bearing 26 and a corresponding groove 98 in retainer 58 allow the adjustable apparatus 10 to rotate freely until an end portion of the grooves 97 and 98 are butted against stop 96. In one constructed model a 60-degree range of rotation is allowed, 30 degrees to the right and 30 degrees to the left. If desired, the range of rotation can be increased by lengthening the corresponding grooves 97 and 98.

As the operator rotates and tilts the video display terminal 11 to its desired position, movement about the horizontal axis or yaw is prevented by the supporting action of end walls 34 of the socket bearing 26 against side walls 42 of the journal 22. Further stability is gained due to the confinement of shank 91 of the shoulder screw 52 within slot 40. However, tolerances between walls 34 and 42 and between shank 91 and slot 40 are within limits that prevent unwanted binding.

In this illustrative embodiment of the invention, the coactive elements, i.e., annular support 16, socket bearing 26 and journal 22 are molded from a thermosetting plastic structural foam which offers lightness, strength and excellent frictional properties. The strength is required in order to carry the relatively heavy superstructure 11 and the frictional properties are utilized as the journal 22 slides back and forth upon bearing strips 36 and as the socket bearing 26 rotates upon annular support 16. The relatively smooth bearing strips 36, made of an ultrahigh molecular weight polyethylene material, along with the thermosetting plastic provides sliding surfaces having a relatively low coefficient of friction thus allowing the journal 22 to tilt easily and smoothly within socket bearing 26. Together with spring mechanism 30, the frictional bearing arrangement prevents the superstructure 11 from moving to an extreme tilt position. Both the annular support 16 and journal 22 are advantageously molded into their respective housings 14 and 18.

Figure 6:
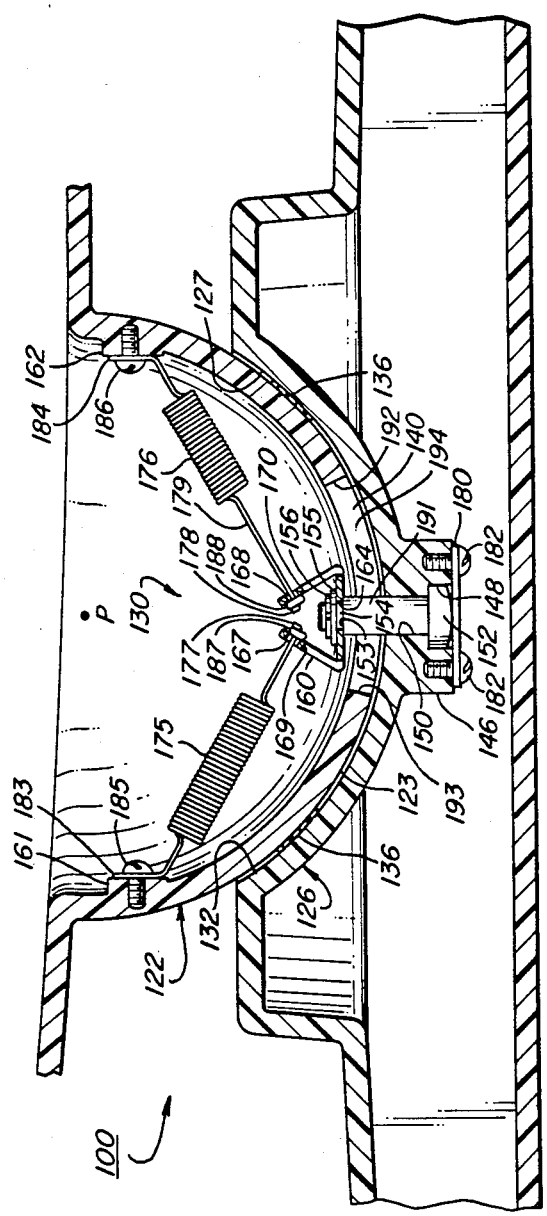
FIG. 6 is a vertical sectional view through the mounting apparatus of an alternative exemplary embodiment of the invention which utilizes a spring counterbalanced ball and socket arrangement.

An alternative exemplary embodiment of an adjustable mounting apparatus 100 utilizing a counterbalanced ball and socket arrangement is illustrated in FIG. 6. The design of a particular video display terminal may not require a base capable of housing electronic components and/or not require cable access openings between the base assembly and superstructure. In this case, the adjustable mounting apparatus 100 which does not require a separate assembly for providing left and right rotation could be utilized to achieve the operational features of the first exemplary embodiment, i.e., to allow the superstructure to be rotated and tilted through a wide range of angles smoothly and with minimal effort by an operator.

The adjustable mounting apparatus 100 consists of a ball part 122, a mating socket bearing 126 and a spring mechanism 130. The shape of the ball part 122 is that of a spherical segment upon which a supported superstructure (not shown) is tilted and rotated. A convex surface 123 of the ball part 122 has molded therein a centrally located pin access slot 140 which is used to both limit the range of tilt and to prevent yaw of the superstructure. A front boss 161 and rear boss 162 are molded within the ball part 122 to provide a mounting surface for a spring mechanism 130.

The socket bearing 126 has molded therein a socket 132 whose shape conforms to that of ball part 122. A concave surface 127 of the socket 132 has bonded annularly thereto thin bearing pads 136 for frictionally supporting ball part 122. A centrally located boss 146 molded on the underside of socket 132 provides a square recess 148 and pin access hole 150 which are used to capture a shoulder pin 152.

The spring mechanism 130 is attached to the socket bearing 126 by a center bracket 160 and to the ball part 122 at front boss 161 and rear boss 162. The square headed shoulder pin 152 is held in boss 146 by plate 180 and screws 182, passes through pin access slot 140 of the ball part 122 and through a hole 164 in center bracket 160. The center bracket 160 is loosely secured atop shoulder 153 of the shoulder pin 152 by a washer 155 and a split ring 156 allowing center bracket 160 to freely rotate about the neck 154 of shoulder pin 152. An extension spring 175 links the front boss 161 to the center bracket 160 and an extension spring 176 links the rear boss 162 to the center bracket 160. Two opposing through-holes 167 and 168 are provided in arms 169 and 170 of center bracket 160 to catch tines 177 and 178 of extension springs 175 and 176, respectively. Two "O" rings 187 and 188 cushion tines 177 and 178 against arms 169 and 170. The loop 183 of extension spring 175 is attached to front boss 161 by screw 185 and the loop 184 of extension spring 176 is attached to rear boss 162 by screw 186. Both springs 175 and 176 are slightly extended when the superstructure is in the neutral position.

As an operator rotates and tilts a superstructure supported by the adjustable mounting apparatus 100, the convex surface 123 of ball part 122 moves over the surface of the bearing pads 136. A rotational movement of the superstructure will cause the ball part 122 to rotate about the shank 191 of shoulder pin 152 and a tilting movement allows the ball part 122 to move within the length of pin access slot 140. As the ball part 122 is rotated about the vertical axis, center bracket 160 follows the movement of ball part 122; thus, keeping extension springs 175 and 176 in their proper alignment within ball part 122. As the superstructure is tilted backward the ball part 122 pulls on loop 183 at boss 161, extending spring 175 which counters the torque exerted by the backward movement of the center of gravity of the superstructure. The operator can stop the superstructure at any point within its range of movement and its position will remain stable because of the counterbalancing effect of the extended spring 175 and the friction between surface 123 and bearing pads 136.

The backward and forward limits in the range of tilt are determined by the point where the shank 191 of shoulder pin 152 is butted against the back end 192 and front end 193 of the slot 140. As spring 175 is extended, spring 176 remains unextended because a straight portion 179 of spring 176 passes freely through hole 168 in arm 170, and under arm 169. In a similar manner, as the superstructure is tilted forward, spring 175 becomes extended and spring 176 remains unextended. The slight expansion of springs 175 and 176 in the neutral position along with the cushioning effect of "O" rings 187 and 188 provide a smooth transition of the spring mechanism 130 as the superstructure is tilted through the neutral position. As the operator rotates and tilts the superstructure to its desired position, movement about the horizontal axis or yaw is prevented by the supporting action of the side walls 194 of slot 140 against the shank 191 of shoulder pin 152.

The ball and socket arrangement of FIG. 6 and the journal and socket arrangement of FIGS. 1-5 represent two geometries of bearing and borne surface pairs. In general, any pair of surfaces which are defined by surfaces of revolution about a common axis can be used, since such surfaces match and are capable of moving one with respect to the other about an axis of rotation. For example, the bearing and borne surfaces could be portions of cone surfaces, the cone having as its central axis the tilt axis of the superstructure. The portions of the surfaces of revolution need not be complete segments, provided that at all angles of tilt, some portion of the bearing and borne surfaces be in frictional contact.

The arrangements described in FIGS. 1-6 show a superstructure supported from a base below the superstructure. The same arrangement can be used if the base is attached to a ceiling or wall provided that the bearing surface attached to the base provides support for the bearing surface attached to the superstructure over the full range of tilt angles. In some of these configurations, gravity tends to return the superstructure to the neutral position, and spring arrangements which are appropriately mounted and constrained to provide counteracting forces tending to push the superstructure further from neutral must be used.

What has been described is considered to be only two illustrative embodiments of the invention. Thus, it is to be understood that various and numerous other arrangements may be devised by one skilled in the art without departing from the spirit and scope of the invention. For example, although the spring mechanisms shown utilize two alternatively acting expansion springs, this mechanism could use a single spring or instead use one or two helical compression, spiral, or torsional springs. The adjustable mounting apparatus of this invention could then be readily correspondingly modified. The invention is thus limited only as defined in the accompanying claims.

What is claimed is:

1. An adjustable display monitor, comprising:
   a superstructure, mounted to be adjusted about a neutral tilt position such that gravitational forces tend to pull said superstructure further from said neutral position when said superstructure is displaced therefrom, having a first curved continuous frictional bearing surface defined by a portion of a cylinder;
   a base having a second curved frictional bearing surface frictionally and slidingly engaged with and matching said first surface, a frictional force being produced between said two surfaces; and
   spring means attached to said superstructure and said base to exert a force in either of two opposite directions on said superstructure tending to restore said superstructure to said neutral tilt position when said superstructure is moved from said neutral tilt position in either of two opposite directions;
   said frictional force and said spring force being sufficient to counterbalance said gravitational forces and maintain said superstructure in any position.

2. The apparatus of claim 1 in which said spring means comprises two helical springs, attached so as to exert restorative forces in opposite directions.

3. The apparatus of claim 2 in which both of said two helical springs are stressed simultaneously during part of the range of movement of said superstructure when said superstructure is moved over its range of movement.

4. The apparatus of claim 2 in which only one of each of said two helical springs is stressed during a part of the range of movement of said superstructure when said superstructure is moved over its range of movement.

5. The apparatus of claim 2 in which said base comprises a fixed and a movable assembly, in which said second curved surface is on said movable assembly, and in which said movable assembly is rotatively attached to said fixed assembly.

6. The apparatus of claim 1 in which the surface material of one of said first and said second surfaces is composed essentially of thermosetting plastic material.

7. The apparatus of claim 6 in which said thermosetting plastic material is thermosetting plastic structural foam.

8. The apparatus of claim 1 in which one of said first and second surfaces comprises a bearing strip.

9. The apparatus of claim 8 in which said bearing strip comprises ultrahigh molecular weight polyethylene material.

10. An adjustable display monitor, comprising:
    a superstructure, mounted to be adjusted about a neutral tilt position such that gravitational forces tend to pull said superstructure further from said neutral position when said superstructure is displaced therefrom, having a first curved continuous frictional bearing surface defined by a portion of sphere;
    a base having a second curved frictional bearing surface frictionally and slidingly engaged with and matching said first surface, a frictional force being produced between said two surfaces; and
    spring means attached to said superstructure and said base to exert a force in either of two opposite directions on said superstructure tending to restore said superstructure to said neutral tilt position when said superstructure is moved from said neutral tilt position in either of two opposite directions;
    said frictional force and said spring force being sufficient to counterbalance said gravitational forces and maintain said superstructure in any position.

11. The apparatus of claim 10, in which said spring means comprises two helical springs, attached so as to exert restorative forces in opposite directions.

12. The apparatus of claim 11 in which said two helical springs are both stressed simultaneously during part of the range of movement of said superstructure when said superstructure is moved over its range of movement.

13. The apparatus of claim 11 in which only one of each of said two helical springs is stressed during at least a part of the range of movement of said superstructure when said superstructure is moved over its range of movement.

14. The apparatus of claim 10 in which the surface material of one of said first and said second surfaces is composed essentially of thermosetting plastic material.

15. The apparatus of claim 10 in which one of said first and second surfaces comprises a bearing pad.

16. The apparatus of claim 15 in which said bearing pad comprises ultrahigh molecular weight polyethylene material.

17. Apparatus for movably mounting the superstructure of a display monitor on a base, comprising:
    a first mounting structure, for attachment to a superstructure, having a first curved continuous frictional bearing surface defined by a portion of a cylinder, wherein a superstructure mounted thereon is positioned to be adjusted about a neutral tilt position such that gravitational forces tend to pull said mounted superstructure further from said neutral position when said superstructure is displaced therefrom;
    a second mounting structure, for attachment to a base, having a second curved frictional bearing surface frictionally and slidingly engaged with and matching said first surface, a frictional force being produced between said two surfaces; and
    spring means attached to said first and said second mounting structures to exert a force in either of two opposite directions on said mounted superstructure tending to restore said mounted superstructure to said neutral tilt position when said mounted superstructure is moved from said neutral position in either of two opposite directions;
    said frictional force and said spring force being sufficient to counterbalance said gravitational forces and maintain said mounted superstructure in any position.

18. Apparatus for movably mounting a display monitor on a base, comprising:

a first mounting structure, for attachment to a display monitor, having a convex curved continuous frictional bearing surface that comprises a portion of a cylinder wherein a display monitor mounted thereon is positioned to be adjusted about a neutral tilt position such that gravitational forces tend to pull said mounted display monitor further from said neutral position when said superstructure is displaced therefrom;

a second mounting structure, attached to a base, having a concave curved frictional bearing surface frictionally and slidingly engaged with and matching said convex surface, a frictional force being produced between said two surfaces; and spring means attached to said first and said second mounting structures to exert a force in either of two opposite directions on said mounted display monitor tending to restore said mounted display monitor to said neutral tilt position when said mounted display monitor is moved from said neutral tilt position in either of two opposite directions, said spring means comprising two helical springs attached so as to exert forces in opposite direction;

said frictional force and said spring force being sufficient to counterbalance said gravitational forces and maintain said mounted superstructure in any position.

19. The apparatus of claim 18 in which:

said second mounting structure is rotatively attached to said base;

the surface material of said convex surface is composed essentially of thermosetting plastic structural foam; and said concave surface comprises a bearing strip, said bearing strip comprising ultrahigh molecular weight polyethylene material.

20. The apparatus of claim 19 in which both of said two helical springs are stressed simultaneously during part of the range and only one of each of said two helical springs is stressed during other parts of the range of movement of said video display unit when said video display unit is moved over its range of movement.

21. An adjustable display monitor, comprising:

a superstructure, mounted to be adjusted about a neutral tilt position such that gravitational forces tend to pull said superstructure further from said neutral position when said superstructure is displaced therefrom, comprising a video display unit and having a bottom surface comprising a first curved continuous frictional bearing surface defined by a portion of the surface of a cylinder;

a bracket attached to said superstructure, passing through said first surface;

a base comprising a fixed assembly and a movable assembly rotatably attached to said fixed assembly, said movable assembly having a second curved frictional bearing surface frictionally and slidingly engaged with and matching said first surface, a frictional force being produced between said two curved surfaces, said superstructure being supported on said second curved surface; and spring means attached to said bracket and said movable assembly to exert a force in either of two opposite directions on said superstructure tending to restore said superstructure to said neutral tilt position when said superstructure is moved from said neutral tilt angle in either of two opposite directions, said spring means comprising two helical springs attached so as to exert restorative forces in opposite directions and in which only one of each of said two helical springs is stressed during a part of the range of movement of said superstructure when said superstructure is moved over its range of movement;

said frictional force and said spring force being sufficient to counterbalance said gravitational forces and maintain said superstructure in any position;

said first curved surface having surface material comprising thermosetting plastic structural foam;

said second curved surface comprising a bearing strip, said bearing strip comprising ultrahigh molecular weight polyethylene material;

said second curved surface having an elongated slot for accommodating said bracket as said superstructure is moved over its range of movement;

wherein said spring means is attached to said movable assembly at two essentially opposite points and is attached to said superstructure by a structural member connected to said first curved surface.

* * * * *